Jan. 10, 1967 H. VRANIAN 3,296,993
PACKING MEANS
Filed April 30, 1965 2 Sheets-Sheet 2
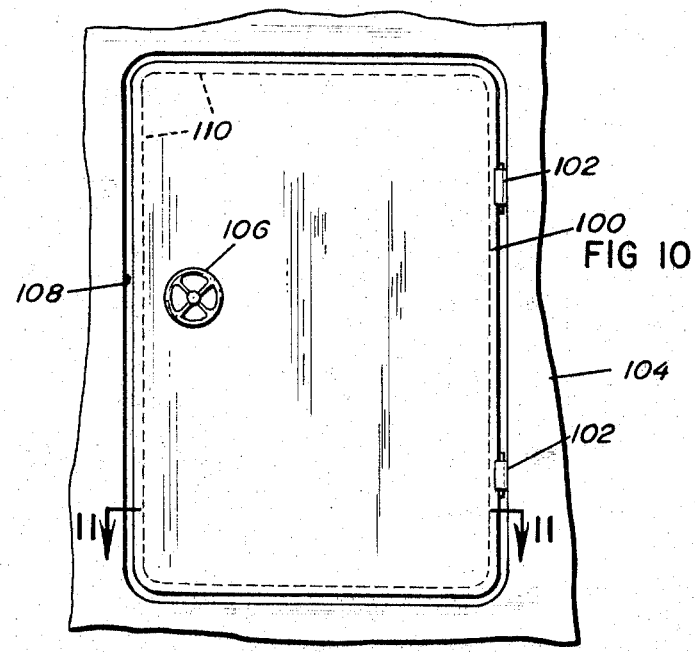
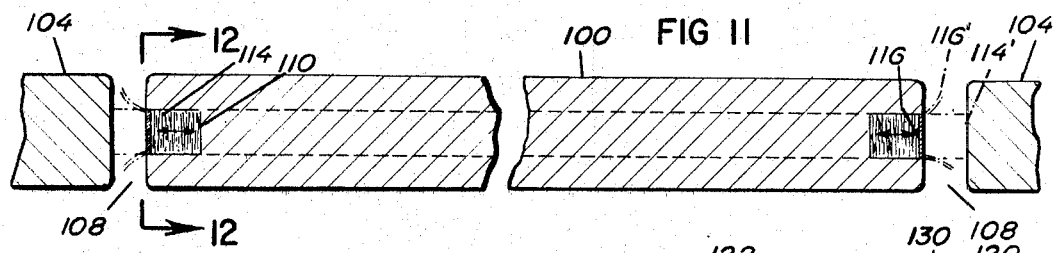
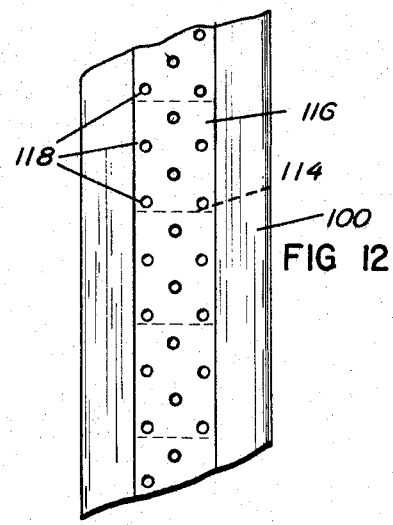
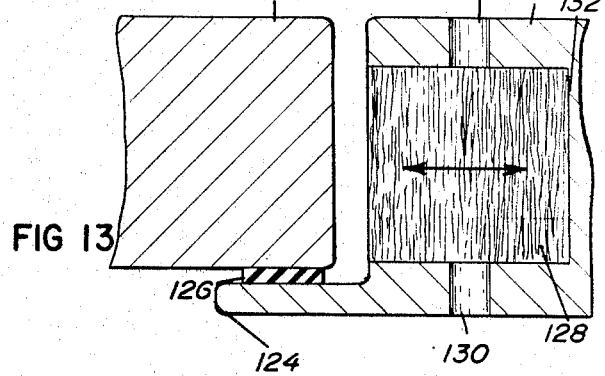
INVENTOR
Henry Vranian
BY Jacobi and Davidson
ATTORNEYS United States Patent Office 3,296,993
Patented Jan. 10, 1967

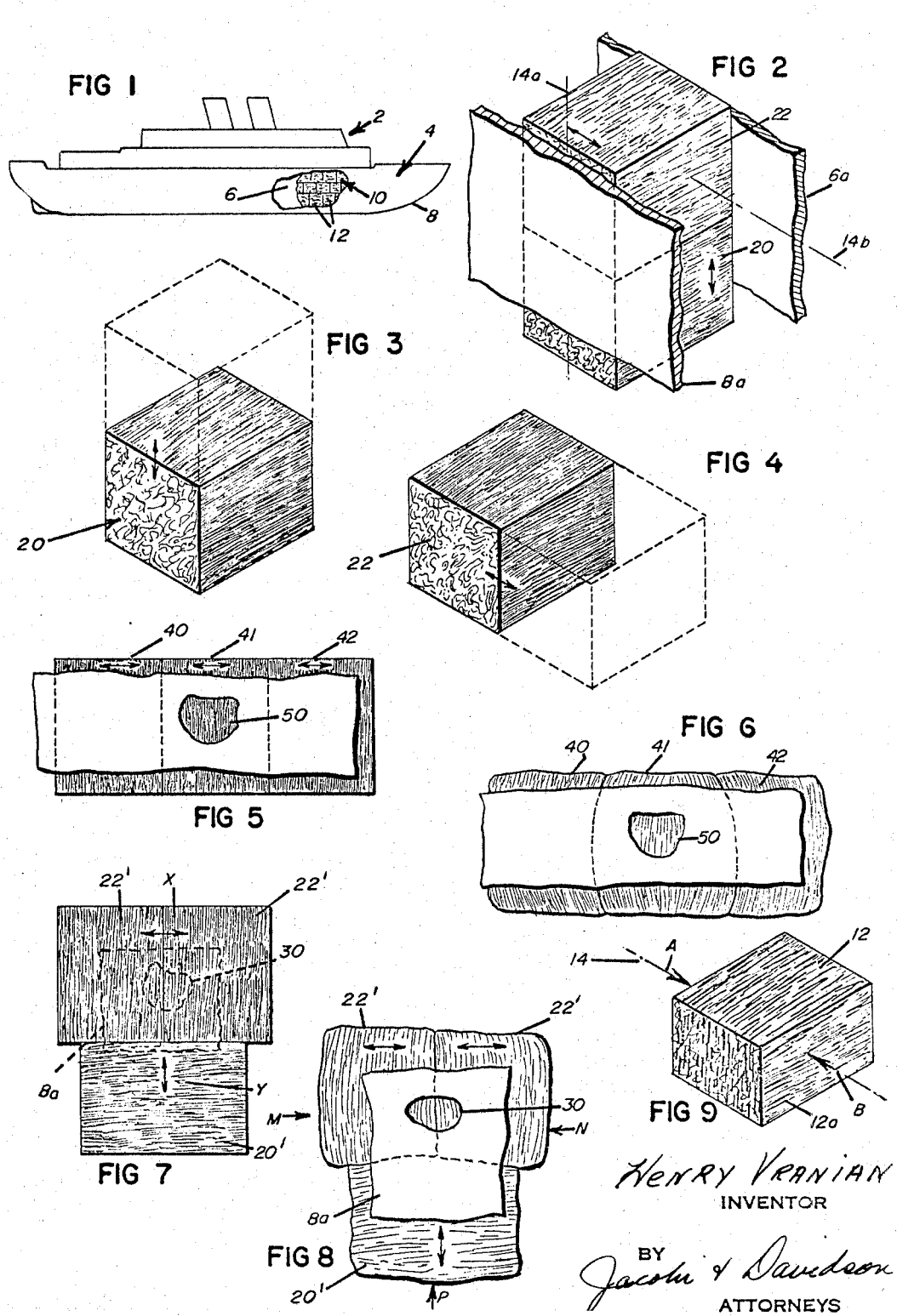

3,296,993
PACKING MEANS
Henry Vranian, Rte. 1, West Point, Va. 23181
Filed Apr. 30, 1965, Ser. No. 452,272
24 Claims. (Cl. 114—69)

This is a continuation-in-part of my earlier application, Serial No. 357,079, filed April 3, 1964.

This invention relates generally to packing means, and is particularly concerned with the provision of expansible material usable to effect a sealing operation, and if desired, acoustical and shielding functions.

Although the invention finds utility in various environments, it affords particular advantage when employed in floatable means or bodies, such as ships, submarines and the like. Accordingly, for convenience, the invention is described herein as employed in such environment, but it is to be understood that the invention is not necessarily limited to the exemplary use discussed. Further, the use of the term "ship" or "floating body" in the specification and claims will be understood to pertain to any floatable means whether the same is adapted to float on top of the water or beneath the same. Additionally, these terms are intended to include other liquid supported devices such as offshore drilling rigs, floating docks and the like.

To facilitate an understanding of some of the more basic aspects of the invention, consideration is initially given to a conventional type ship and experiences which such a ship may encounter, such as, for example, a rupture or break in a hull wall. Normally, seagoing vessels are constructed with inner and outer hull walls. The respective walls are disposed in generally parallel spaced apart relationship, and supporting braces, or the like, are incorporated to maintain the respective walls in desired position. Yet, if, for example, the outer wall is ruptured, the ship begins to take-on water, and if the quantity of water entering the ship is sufficiently substantial, the ship, of course, tends to sink. If both walls of the hull are ruptured, the tendency of sinking is more substantial, but whether the rupture be in one or both walls, stopping the leak is often critical.

There have been various prior suggestions as to how some sort of packing, such as, paper, cotton, or other fibrous material may be placed between the inner and outer hull walls of a ship to effect a barrier or seal in the vicinity of a wall rupture. Supposedly, the materials utilized according to such prior suggestions are expandable when exposed to water so that they swell to cause a damming action. Notwithstanding the prior suggestions, it appears that no substantial commercial use, in any event has been made of expandable packings in ship hulls.

It would seem that the prior suggestions either involve the use of materials which are sufficiently expensive to prevent their effective use, or which are ineffective, under operating conditions, to give the desired results. Moreover, the prior suggestions which have been made with respect to the use of expansible packing materials tend to subject a ship with which the materials are used to undue stresses and pressures, so that any damming or sealing action which may result is rendered ineffective by virtue of non-desired internal stresses experienced.

In addition to immediately stopping the leak in one or more of the hull walls of a ship, it is important to preclude passage of water taken on in one chamber of a vessel to other chambers. Generally, floating bodies of the type with which the instant invention is concerned have a plurality of internal compartments or chambers. In the event that a substantial quantity of water is received by one of the chambers due to a rupture in the hull which cannot be sealed, it is important to confine the water taken on to that chamber in order to avoid sinking the ship. Under normal circumstances, even if a few of the ship's compartments are filled with water, sufficient buoyancy is provided by the remainder of the compartments to maintain the ship afloat. The individual chambers are separated by doors which are intended to provide a barrier to the passage of water. According to the prior art constructions many gasketing materials such as rubber and plastics have been utilized in an attempt to provide the water-tight seal necessary to this function. However, such prior art materials are subject to many disadvantages including their inability to maintain a water-tight seal after extended use, their tendency towards deterioration under the influence of the salt water atmosphere and their relatively high cost. Thus, no truly effective and satisfactory packing or sealing means for use under these conditions have been found to date.

The preceding discussion of the prior suggestions is not intended to be comprehensive in every respect, but instead is presented to illustrate the general state of the prior art and the problems encountered with use of the suggestions contained therein. Such discussion, moreover, indicates the background of the present invention.

In essence, the present invention is directed to the provision of a packing or sealing material which can be effectively used in a ship hull, for example, to provide a desired sealing or damming action in the event of a rupture of the hull walls without being subject to the disadvantages previously encountered and can also be used to provide a water-proof seal around the doors between adjacent compartments in a ship to limit the damage caused by a major leak in the hull which cannot otherwise be stopped. Thus, it is a primary object of the present invention to provide in combination with a pair of spaced elements, such as the area between the double walls of a ship's hull or the space between a door and its frame in a ship, an effective and inexpensive expandable packing or sealing means and to provide physical properties and/or structural features which permit the expandable packing to cause an effective damming or sealing action without being subject to the limitations heretofore experienced.

Consistent with the preceding more general objects, other important objects hereof regarding the packing material include: (a) the provision of an inexpensive and expandable packing material, which can be formed as stable expandable bodies so as to be readily usable in ships construction; (b) the provision of such a material which, as formed, is controllably expansible, i.e., monoaxially expansible upon being subjected to water or other liquid; (c) the provision of such a material which is capable of not only effecting the sealing operation desired, but which is also capable of forming an effective barrier to missiles or bullets so as to absorb energy therefrom and minimize the destruction which may otherwise be produced thereby; (d) the provision of such a material which further possesses desired acoustical properties so as to at least hinder detection of a vessel with which it is used by electronic sound detecting means, such as, sonar, or the like; and (e) the provision of such a material which can be easily made available inexpensively and with existing equipment.

From the standpoint of structural aspects, as opposed to material aspects, the invention has certain additional more specific, but significant objects, including, with particular regard to the first embodiment: (a) the provision in an enclosed area of a plurality of hydrophilic fibrous bodies so disposed and arranged as to expand when subjected to water to form an effective dam or seal about a rupture or break in a wall or walls of, for example, a ship's hull; (b) the provision of such an arrangement of hydrophilic fibrous bodies which insures migration of the fibrous material upon expansion toward the area where the rupture or puncture has occurred without unduly stressing the adjacent wall or walls which may have been ruptured; (c) the provision of such an arrangement of such bodies which effectively provides for water absorption and consequent expansion of the respective bodies in such sequence that the fibrous material is pushed toward and essentially compressed in the area of rupture or break in a successively, and if necessary, continuous, manner such that the damming or sealing action automatically compensates for any loss or "wash-away" of material in the area of the puncture or rupture; (d) the provision of such an arrangement of bodies wherein the expansion takes place monoaxially within any given body, and yet preferably parallel to the major surfaces of the enclosing walls, such as, the ship's hull walls, for example, whereby the damming action of the material does not tend to stress the walls by forcing the same apart when the material is subjected to water and expands; and (e) the provision of such an arrangement of hydrophilic fibrous bodies within an enclosed area such as the area between the inner and outer walls of a ship's hull, which arrangement results not only in expansion of the material to achieve the desired damming or sealing function, but also at least partial compression of material about the area of the puncture or rupture so that only a minimum of water can be absorbed by the expansible material before the same prevents further water travel to remote locations of packing material or bodies; and, with particular regard to the second embodiment: (f) the provision between a door and its frame in a ship of a hydrophilic fibrous gasket adapted when subjected to water to form an effective seal precluding passage of water from one compartment to the next; (g) the provision of such a sealing means wherein the expansion takes place monoaxially whereby the response is instantaneous and under great pressure in order that the seal will not be broken by a relatively high concentration of water on one side of the door; (h) the provision of such a sealing means carried, for example, by the periphery of the door and normally spaced slightly from the frame in order that the door may be readily closed under ordinary circumstances; and (i) the provision of means to enable the expansible material to quickly receive sufficient water whereby it will expand to produce its sealing function before any substantial quantity of the water can pass into the adjacent compartment.

Auxiliary to the preceding basic, yet specific, objects hereof, there are two further particularly significant aspects of the invention, namely, (1) the provision of a packing material which conforms with all of the preceding objects, and yet which consists predominantly of dry wood pulp alone, or as mixed with reinforcing or stabilizing fibers, such as, cotton, acrylic fibers, nylon, and the like; and (2) the provision of fibrous bodies such as specified above, which further include fixative or stabilizing compositions adapted to react with water, upon expansion of the body with which they are associated, to effectively stabilize such body in its expanded condition.

Consistent with the basic aspects of the invention, hydrophilic fibrous material, preferably dry wood pulp, as compressed monoaxially in a suitable compression means, is utilized. The fibrous material for use between the hull walls preferably takes the form of a group of bodies, sheets, or slabs, hereinafter generically referred to as bodies, which, as monoaxially compressed, are expandable monoaxially. The bodies are arranged in the enclosed area with their axis of expansion disposed preferably parallel to the major wall surfaces. Such bodies act as sound absorbers, and as barriers for missiles, such as, torpedoes, bullets, or the like. Moreover, and equally if not more important, should one or more of the walls of the enclosed area be ruptured, and should water then enter through the rupture, the bodies expand and migrate laterally toward the opening through which the water is entering. With the expansion, the opening is essentially plugged, and further absorption of the water and consequent expansion of the material is prevented since the water cannot migrate further than the distance necessary to yield the desired expansion and consequent damming. However, should some of the material wash away, further expansion can take place with successive bodies of the material, and the damming is again achieved.

When used for its gasketing function, the fibrous material may also take the form of a group of individual bodies such as those referred to above or may, alternatively, be in the form of a continuous strip. However, in any event, for this embodiment the material is arranged with its axis of expansion disposed perpendicularly to the surfaces defined by the periphery of the door and the door frame so that, upon expansion, it will fill the space therebetween.

The invention will be better understood, and objects other than those specifically set forth above will become apparent, after reading the following detailed description. Such description makes reference to preferred and illustrative features of the invention presented in the annexed drawings, wherein:

FIGURE 1 is an illustrative side view, partially broken away, of a ship utilizing the invention hereof as a packing material intermediate the hull walls;

FIGURE 2 is a fragmental schematic and illustrative view showing a section of the hull of FIGURE 1 with one arrangement of fibrous bodies disposed therein and in accordance herewith;

FIGURE 3 is a schematic and illustrative perspective view of one of the bodies presented in FIGURE 2;

FIGURE 4 is a schematic and illustrative perspective view of another of the bodies presented in FIGURE 2;

FIGURE 5 is a schematic illustrative fragmental view of a section of a ship in which an alternate embodiment of the invention has been utilized as a packing between the hull walls;

FIGURE 6 is similar to FIGURE 5, but shows the fibrous bodies hereof in the alternate arrangement as the same might appear after expansion, whereas FIGURE 5 shows such bodies before expansion;

FIGURE 7 is a schematic fragmental illustrative view similar to FIGURE 2, but more completely showing a group of bodies as arranged in accordance herewith in association with a sidewall portion of a given enclosed area, such as ship's hull;

FIGURE 8 is an illustrative fragmental view corresponding to FIGURE 7, but showing the fibrous bodies associated with the wall portion as the same might appear following expansion;

FIGURE 9 is an illustrative perspective view showing a fibrous body such as one of the fibrous bodies utilized in the arrangement of the other views;

FIGURE 10 is an illustrative elevational view of a door and frame utilizing the material of this invention as a sealing means therebetween;

FIGURE 11 is an enlarged fragmentary cross-sectional view taken substantially on line 11—11 of FIGURE 10, partly broken away for illustrative convenience, and showing the expanded position of the sealing means in dotted lines;

FIGURE 12 is a fragmentary elevational view of a portion of the periphery of the door and taken substantially on line 12—12 of FIGURE 11; and FIGURE 13 is an enlarged fragmentary cross-sectional view through a portion of a further embodiment of door and frame incorporating a sealing means according to the instant inventive concept.

Like reference characters refer to like parts throughout the several views of the drawings.

Referring now to the drawings, and more particularly to FIGURES 1–9, it will be understood that these embodiments of the invention can be applied to various types of enclosed areas, as explained above. Still, the inventive concept appears to have major importance, at least at present, when used in combination with a ship. Thus, in FIGURE 1, the numeral 2 designates the schematic representation of a ship. The particular type of ship, the details of construction of the ship, the type of power used for the ship, and the like, are insignificant as far as the present invention is concerned with regard to any of the embodiments. At the same time, as shown, the ship 2 has a hull 4 comprising an inner wall 6 and an outer wall 8. The inner wall 6 and outer wall 8 extend generally parallel to one another, but are supported in spaced apart relation so as to define an area 10 therebetween. The area 10 is filled with a plurality of hydrophilic fibrous bodies, such as the bodies 12.

The fibrous bodies 12 predominantly comprise hydrophilic fibrous material, i.e., fibrous material having substantial affinity for water or other liquid. In accordance with the preferred embodiment hereof, this hydrophilic fibrous material is wood pulp, such as used in manufacturing paper. However, it is to be understood that the bodies 12 can also comprise, preferably in minor proportion, other fibrous materials, such as vegetable fibers, e.g., cotton, or synthetic fibers, e.g., rayon, acrylic fibers, and the like.

Where wood pulp or wood fiber is used, the same can be either chemically processed pulp, semi-chemical processed pulp or mechanically processed pulp, all as suitable for further processing into paper. The particular treating process used can be varied depending upon the exact ultimate characteristics desired with the fiber length and blending of different types of fibers being controlled to afford the strength necessary for a given application.

In any event, the hydrophilic fibrous material as ultimately used is dry, and moreover, the same has been compressed in a suitable compression means, such as a hydraulic press, so that the hydrophilic fibrous material takes the form of a stable body. If desired, or if necessary by virtue of the particular processing procedure used initially, chemical additives can be employed to insure initial stability of the compressed mass into the form of a body expandable with absorption of water.

Where chemically, semi-chemically, or mechanically processed wood pulp or fiber suitable normally for use in further processing into paper is employed to form the fibrous bodies, the overall structure of any body formed in accordance herewith appears uniform even though the same has somewhat rough exterior surfaces. Yet, there is a tendency of the bodies to be somewhat layered if one attempts to separate the material, in any given body.

In FIGURE 9, a body 12 of hydrophilic fibrous and processed pulp is shown schematically. The respective arrows A and B are presented to indicate that this body of material has been compressed monoaxially, i.e., along the axis 14. The layer-type structure shown for the body 12 has been emphasized in FIGURE 9, and it is to be appreciated that the layers will not appear as shown in FIGURE 9, but instead the body will appear to be generally uniform. At the same time, the fibers in the body are generally directionally oriented so that the major portions thereof lay parallel to the front face 12a of the body 12. In other words, the fibers within the body 12 do not extend with their length disposed perpendicular to the face 12a but instead they are so oriented following compression that the fiber lengths lie generally parallel to the forward face 12a, thus forming successive folds or layers.

Of course, there are certain agglomerations or accumulations of comparatively short fiber materials in any given quantity of compressed pulp, and thus all of the fibers do not necessarily have the orientation in question. At the same time, the fibers of any substantial length within the body are oriented generally in the manner indicated. The material, as compressed and formed into a body, such as the body 12, is preferably substantially dry initially, but the same can be further dried, if necessary. Moreover, it has been found most expedient to form a body such as the body 12 as part of an overall sheet of material resulting from a compression operation. So-called "slabs" of pulp as presently available in the paper industry provide desirable bodies alone, or as cut into segments, for use according to the invention, i.e., such slabs or segments thereof are satisfactory and preferred hydrophilic fibrous bodies.

Such bodies, as compressed and dried, and whether formed individually, or cut from a sheet of compressed hydrophilic fibrous material, having certain expansion properties. Specifically, a body such as the body 12 is monoaxially expandable when subjected to water or other liquid. The expansion takes place, if the body 12 is inserted in water, for example, along with axis 14, i.e., the axis of compression. The expansion of a body in other directions when liquid is absorbed therein, is inconsequential in comparison to the expansion along the axis 14.

It has been found that for all of the embodiments herein disclosed, a preferred and completely satisfactory material is the monoaxially compressed, hydrophilic fibrous, expandable material marketed by the Chesapeake Corporation of Virginia, under the trademark "Xpandyne."

Although the body 12 has been shown as formed into a block, the invention contemplates, if desired, the formation of such body with a contour which conforms with the contour of the area in which the same is to be inserted. Thus, for example, if the body 12 is to be used in a curved area of the hull of the ship 2, then the same can be formed with an arcuate contour so that it readily conforms to the curvature of the hull. Moreover, shaping the material prior to insertion of the same in its ultimate position of use permits one to achieve the desired expansion characteristics now to be explained.

To understand the preferred structural arrangement of the hydrophilic fibrous bodies within a given area, such as between the inner and outer hull walls of a ship, attention is directed to FIGURE 2. Here it is assumed that the fragmental wall sections 6a and 8a constitute portions of the respective walls 6 and 8 of the hull 4 shown in FIGURE 1. Disposed between the respective wall sections 6a and 8a, are a pair of hydrophilic compressed fibrous bodies in the form of blocks 20 and 22. These respective blocks 20 and 22 correspond exactly to the body 12 shown in FIGURE 9, and different numerals have been used merely for convenience of description.

The block 20 is oriented so that the primary axis of expansion thereof extends vertically. On the other hand, the block 22 is so oriented in FIGURE 2 that the axis of expansion thereof extends horizontally. Relating this aspect to FIGURE 9, the block 20 has an axis of expansion 14a and the block 22 has an axis of expansion 14b, which respective axes of expansion correspond to the axis of expansion 14 of the body 12 of FIGURE 9.

Although only two blocks of material have been shown in FIGURE 2, it will be understood that as many blocks as necessary to fill the space between the respective walls 6 and 8 are incorporated. The two blocks have been shown merely to illustrate respective blocks in differently oriented groups of blocks which can be provided.

The block 20, when subjected to water, readily absorbs the same. The absorption of the water by such block results in a vertical expansion thereof so that the block essentially becomes an elongated body. For example, FIGURE 3 presents the block 20 in solid line in its initial condition, and further presents dotted lines showing the area which would be occupied by the block 20 after being subjected to water.

In contrast, FIGURE 4 presents the block 22, showing in dotted line the increased area which would be occupied by such block after the same absorbed water and expanded. It will be noted that in each instance, the expansion was essentially monoaxial. This does not mean necessarily that the body will only expand upwardly as shown in FIGURE 3, or to the right, as shown in FIGURE 4. Instead, the blocks can equally expand in opposite directions on the same axis and may well do so, depending upon the restrictive forces exerted thereon. The bodies expand monoaxially in the direction where there is the least resistance to the expansion.

Although different degrees of expansion can be experienced depending on the materials used, the blend of materials, the degree of compression, and other similar factors, it is preferable that these factors be so controlled that the expansion of the body with excess water results in increasing its size by at least half again the original size, and preferably by at least twice the original size. Viewed on this basis, the unrestrained linear expansion should be such that it is at least 50 percent, and preferably at least 100 percent, by volume. Free linear expansion in excess of 500 percent, however, is possible.

To relate the schematic representations of FIGURES 2 through 4, to a practical circumstance, consider FIGURE 7. Here, two blocks or bodies 22' are shown as disposed in overlying relation to a single block 20'. The block 20', while somewhat differently shaped, corresponds to the block 20 of FIGURE 2 being so oriented that its axis of expansion is vertically disposed. On the other hand, the blocks 22' correspond to the block 22 of FIGURE 2 with their respective axes of expansion being horizontally disposed. Yet, in both instances, it is to be noted that the axes of expansion are essentially parallel to the adjacent side wall 8a. (Only the wall 8a is shown in FIGURE 7 for convenience, but it will be readily appreciated that the blocks 20' and 22' are disposed between respective walls such as the walls 6 and 8.)

Let it be assumed that there is a rupture in the wall 8a which results in a hole such as the hole 30. Let it be further assumed that the hole 30 is disposed so that it is below the water line and that water begins to pass through the wall 8a. Should this event take place, then water would immediately be absorbed by the respective bodies 22'. The spontaneous and automatic reaction would be for the bodies 22' to begin their monoaxial expansion. This would cause the hydrophilic fibrous material in the respective bodies 22' to migrate in the directions indicated by the reversed arrow X. The expansion of these respective bodies would cause a migration of the material toward the aperture 30 with the laterally disposed bodies on opposite sides of the respective bodies 22' restraining movement of the bodies 22' to a certain extent. As the bodies 22' expanded, with the absorption of water, an effective packing would be formed, under the expansion pressure. If sufficient water entered the aperture 30, and the bodies 22' became sufficiently wet before damming the aperture 30, then some of such water may encounter the body 20', in which event the same would begin to expand, but in this instance monoaxially in the directions of the reversed arrow Y. The expansion would tend to push the hydrophilic fibrous material until the resistive forces of successively adjacent hydrophilic fibrous bodies, or the bottom or top wall, stop the expansion. At such time, the material would have migrated to a point where it effectively dams the aperture 30.

The net result of the expansion, as shown in FIGURE 8, would be that the repsective bodies 22' and 20' expand monoaxially in opposite directions parallel to the respective walls 8a and 6a until such time as they form an effective dike or plug for the aperture 30. At this time, the leak would stop. Still, with turbulence, and depending on the size of the aperture 30, there may be a wash-away or loss of material through such aperture. As the material is lost, more water would enter the aperture, and in turn, be transmitted to successively adjacent bodies or to further portions of the respective bodies 20' and 22'. With the introduction of further water in contact with the remaining portions of the hydrophilic fibrous bodies adjacent the aperture, or in contact with successive hydrophilic fibrous bodies, there is a further expansion again plugging the aperture, i.e., an automatic constant damming of the leak results.

Although in the preceding exemplary discussion, it has been assumed that there is only an aperture 30 in the wall 8a, it will be understood that the same action would take place if there was a rupture in both walls as opposed to one. In such case, as with larger apertures in one wall, there is merely a greater liquid absorption and consequent expansion of successive bodies tending to plug the rupture, puncture, or the like. In any instance, however, it is significant to note that the invention preferably provides for expansion of the respective hydrophilic fibrous bodies parallel to the respective side walls 6a and 8a whereby the same migrate toward the aperture. This is a particularly important aspect as it gives automatic replacement on the material in the area of the rupture. Moreover, with this type of expansion, there is no tendency for the material to expand and force, or tend to force, the respective walls 6a and 8a apart. The primary forces exerted are parallel to such walls. Still further, in the absence of primary expansion perpendicular to the respective walls, the hydrophilic fibrous bodies do not become wedged in a given location, but instead are free to migrate toward the area of rupture so as to constantly replace any material which may be lost, or so as to compress adjacent bodies to give the requisite damming action.

As an alternative to the disposition of respective blocks or bodies, as shown in FIGURE 7 or 8, the arrangement of FIGURES 5 and 6 could be used. Here respective bodies 40, 41 and 42 are disposed in parallel side-by-side relation with their expansion axes extending horizontally. In this instance, should the ship experience a rupture, as for example, a rupture 50, there is a lateral expansion initially of the body 41, as shown in FIGURE 6, with the bodies 40 and 42 in this instance, possibly restricting movement of the body 41 other than to provide the damming action. At the same time, should the rupture be of sufficient size that the body 41 becomes completely saturated, then the bodies 40 and 42 encounter the liquid resulting from the leak and also start their expansion process. Since the material to the right and left of the respective bodies 40 and 42 would at such time be dry, the expansion would result in a migration of the material in the bodies 40 and 42 toward the rupture 50. Naturally, at the initiation of any expansion, regardless of the particular block which initially expands, there is an outward compression until the laterally disposed, lower or upper blocks assume a fixed position to resist further movement. Thereafter, the migration tends to be solely toward the area of rupture.

Even though no closure has been shown in the area between the respective walls 6a and 8a, or for the respective walls 6 and 8 in FIGURE 1, it will be understood that the area between such walls is closed at opposite ends, as for example, by a gunnel closure at the upper end of the respective walls, and a keel closure at the lower end of the respective walls. Moreover, struts and/or braces would be disposed between the walls to maintain the same in spaced apart relation, and even to form the space therebetween into differing sections, in some instances. Notwithstanding these factors, the material hereof, preferably compressed dry wood pulp bodies, would at least substantially fill the spaces which exist between the respective walls so as to be readily available for use in the event of rupture or the like. The hydrophilic fibrous material, and particularly dry wood pulp, is very inexpensive to use, and moreover, it is light thus affording some buoyant action.

Still further, the compressed hydrophilic fibrous bodies utilized in accordance herewith have two auxiliary physical properties which render the same extremely desirable, namely, acoustical properties and barrier properties.

Sound detecting means are commonly used in locating ships at the present time. The hydrophilic fibrous bodies hereof have excellent acoustic properties absorbing soundwaves readily. Thus, when the invention is applied, for example, to a submarine, the detection of the submarine is rendered more difficult in some instances by virtue of the sound absorption properties of the packing material utilized in accordance herewith.

Similarly, such packing material has substantial capacities to absorb energy from moving objects. Accordingly, should a missile such as a bullet or the like, pass through the outer wall of the vessel with which the packing is used, the bodies tend to absorb the shock therefrom and thus serve as an armored barrier tending to prevent passage of the missile, in many instances, into the interior of the vessel, and in any event, rendering the missile less destructive.

It is important to note that when the invention is utilized in the manner prescribed above, only as much material is wetted with the liquid entering the rupture as, is necessary to stop the leak at that time. There is thus not necessarily any water logging or excess accumulation of water within the vessel. Instead, only a sufficient quantity of water is absorbed by the material to permit the necessary expansion to plug the rupture, aperture, or the like. Yet, as indicated above, there may be successive expansion automatically filling an area due to wash away, leakage of the material, or the like, should this successive action prove necessary.

In some instances it is desirable to stabilize the material in expanded condition. To this end, a fixative which reacts with water, so as to set a given body of material in its expanded condition, may be incorporated with the fibers in the initial body. The fixative should be in dry form and should be reactable with the water only when the water is present in saturating quantity. In other words, the fixative should be such that it will remain in its inactive state for substantial periods of time, and not set merely when subjected to a high humidity environment, for example.

Compositions which precipitate calcium silicate in the presence of water are suitable for use as fixatives, and similarly, plaster of Paris has desirable properties for this use. Alternatively, epoxy resin compositions can be used, e.g. solid biphenol A-epichlorhydrin with a solid powdered acid such as oxalic acid. Alternatively, melamine compositions can be used, e.g., melamine formaldehyde with a powdered acid such as oxalic acid or ammonium chloride.

Preferably, modifiers would be incorporated in fixatives of the above prescribed type so as to prevent any setting thereof, and consequent fixation of a body with which they are associated, unless and until the body has completely expanded, and there is a sufficient water contact. Moreover, the fixatives should be such that they do not adhere or cling to associated side walls of the ship with which the bodies are associated, and so that they do not provide a substantial impediment to removal of the bodies from the area once the ship, or the like, has reached dock and it is desired to effect a repair of the ruptured area.

For convenience of the user, the hydrophilic fibrous material to be utilized in the bodies provided in an enclosed area in accordance herewith may be supplied to the consumer as slabs or sheets, and the consumer can, if desired, use the whole sheets and/or saw the sheets into segments for use. Moreover, as indicated above, the bodies may be supplied as formed to a given contour, so as to be readily insertable in a given area or position of use. It will be appreciated from the above that in any instance, it is preferable to fill completely any enclosed area defined by given wall means with the compressed hydrophilic fibrous material so that only minimal water absorption, and/or other liquid absorption and consequent expansion, are necessary to seal a given puncture, rupture or the like. Moreover, by completely filling the space, a more effective sound barrier, and a more effective armored barrier are provided.

The provision of monoaxially expandable hydrophilic fibrous bodies is significant in that it affords migration of the material toward the area of rupture of the leak automatically and under somewhat controlled conditions, and in that it does not overly stress the respective major confining walls such as the spaced apart walls 6 and 8 of the ship 2 of FIGURE 1. In essence, the monoaxial expansion of the fibrous bodies parallel to the major walls or side walls thereof facilitates migration of the material in the proper direction and yet gives sufficient compression of the material in the area of the rupture or puncture to stop the leak.

The use of dry compressed wood pulp should not be under-emphasized. This material, as conventionally available for further use in paper processing, is particularly cheap, and it has been found to be most effective in providing the desired results since its expansion characteristics are most desirable. When suitably compressed, for example, into conventional slab form, the material exhibits a free expansion of over five times its original volume when subjected to sufficient water. Moreover, the material has a fiber orientation of the type indicated above which readily permits disposition of the fibers generally perpendicular to the major adjacent walls surfaces so that expansion of a given body formed of the material takes place parallel to such surfaces. Although wood fiber or pulp is definitely a preferred and advantageous material to utilize, and is used in accordance with the preferred embodiment hereof, for some applications, as also indicated above, reinforcing fibers, fixatives, or the like, can be mixed therewith to achieve the desired ultimate physical properties of the body.

Having now explained the embodiments of this invention directed to the use of hydrophilic fibrous material as a packing between a pair of spaced wall means, reference is now made to FIGURES 10–13 wherein the further embodiment of the instant inventive concept is illustrated. In FIGURE 10 one form of a water impermeable door is shown at 100 pivotally carried by hinge means 102 secured to a frame 104 which surrounds the periphery of the door 100. It is to be understood that the term "frame" may merely be a portion of a wall intermediate adjacent chambers within a ship or the like and may in part be defined by the floor rather than having a raised sill such as shown in FIGURE 10. The particular shape or material from which the door and frame are made is not in any way limiting on the instant inventive concept other than the fact that these materials should be substantially impermeable to whatever liquid it is desired to maintain in one of the adjacent chambers. Further, any conventional latching or locking means illustratively shown by the hand wheel 106 may be carried by the door 100 and operatively engage cooperative portions on the frame 104 in any well known manner.

As will be seen particularly in FIGURE 11 there is ordinarily a space 108 intermediate the door 100 and the frame 104, this space being greatly exaggerated in the drawings for illustrative purposes. According to the embodiment of FIGURES 10–12 the periphery of the door 100 is recessed to define a first surface 110 spaced from an opposing surface 112 of the frame 104. The gasket or sealing means of this invention is designated generally by the reference numeral 114 and is carried within the recess 110. Alternatively, the frame 104 may be recessed and the sealing means carried therein. Further, if desired, both the door and frame may have recesses with sealing means carried in both recesses or with the sealing means carried by one of the elements expanding into the recess on the other element.

The sealing means 110 is formed of a hydrophilic fibrous material such as the material explained in great detail with respect to the embodiments of FIGURES 1–9 and may be in the form of a plurality of discrete blocks such as shown in FIGURE 9 or a continuous strip extending about the entire periphery of the door 100. This material may be secured to the element carrying the same in any desired manner. For example, it can be adhesively fixed in place so long as the adhesive is only applied to such portions as will not hinder expansion when subjected to the absorption of water. Alternatively, a covering means such as shown at 116 may be utilized to retain the sealing means 114 in position. This covering means can take any desired form and is preferably permeable to the liquid. Thus, it could readily be fabricated of a textile material or, alternatively, could be any other form of covering having a plurality of openings such as shown at 118 in FIGURE 12 defined therein to permit entry of water or the like.

As indicated in FIGURE 12, the sealing means in this embodiment is formed by a plurality of individual bodies which facilitates conforming the same to the shape of the door 100. However, as pointed out hereinabove, a substantially continuous strip of the hydrophilic fibrous material may be utilized which strip would be capable of bending to conform to the contour of the periphery of the door.

In FIGURE 11 the expanded configuration of the sealing means is shown at 114' wherein it will be noted that the same has substantially filled the space 108 between the door 100 and frame 104 and is in sealing engagement with the surface 112. The covering means 116, if utilized, should be either sufficiently resilient to allow for the expansion of the sealing means 114 or frangible under the pressure of the expansion so that it will tear or split as shown by the dotted lines 116' in FIGURE 11.

As illustrated by the double headed arrows in FIGURE 11 the hydrophilic fibrous material has been monoaxially compressed so that it will be monoaxially expandable on exposure to, and absorption of, water or the like thereby producing an immediate and forceful pressure in one direction to effect the sealing function. If other than a monoaxially expansible material were utilized, a substantial portion of the same would extrude outwardly through the space 108 between the door 100 and frame 104 thereby decreasing the effectiveness of the seal to withstand the great pressures which may be present due to a large quantity of water in a chamber on one side of the door. Further, materials other than the monoaxially expandable hydrophilic fibrous construction of this invention would tend to be washed away after expansion.

In FIGURE 13 a somewhat modified embodiment of door 120 and frame 122 is shown in part, the door 120 having an overhanging peripheral flange 124 either carrying or engaging a conventional gasket 126 formed of resilient material such as rubber or the like in normal operation of the door. Thus, the gasket 126 will function to provide a seal for most purposes. However, in the event that the gasket 126 fails under an emergency such as a leak in one of the compartments, the monoaxially expandable sealing means 128 of this invention may be included to act in place of, or in addition to, the gasket 126. In order to facilitate a quick response to the presence of water or other liquid, a plurality of apertures 130 may be defined in the door 120 in communication with the recess 132 in which the sealing means 128 is disposed. These apertures 130 may extend around the entire periphery of the door 120. The sealing means 128 may be secured within the recess 132 either adhesively or by a covering means (not shown) or by both.

This latter embodiment is also illustrative of the fact that there may be many variations or modifications of the construction of the door and frame without departing from the scope of the instant inventive concept.

Aside from the factors noted above, there are two additional points applicable to the various described embodiments which should be noted. First, the hydrophilic fibrous bodies can be formed with one or more conventional wetting agents or combinations thereof incorporated therein so as to facilitate the transfer of liquid, and in particular, water throughout the bodies and/or from body to body. Secondly, such bodies can be formed in dies of special configuration, and/or cut into various desired shapes so that they are readily adapted for use in particular environments, surroundings, housings or the like. In this latter regard, such bodies can be provided with openings and/or passageways extending partially or fully therethrough to thus enable even more rapid distribution of liquid or water within and/or throughout the body or bodies in question.

Having now described the invention in considerable detail, it should be apparent that the objects set forth at the outset of the present specification have been successfully achieved.

Accordingly, what is claimed is:

1. In combination, a pair of elements defining a space therebetween, expandable means at least partially filling said space, said expandable means expanding to completely fill said space upon exposure to, and absorption of, a liquid and said expandable means including a fixative which sets upon reaction with the liquid to stabilize said expandable means in its expanded condition.

2. The combination of claim 1 wherein said liquid is water and said expandable means is substantially dry and comprises compressed, predominantly hydrophilic fibrous material.

3. The combination of claim 2 wherein said hydrophilic fibrous material is dry wood pulp.

4. The combination of claim 2 further including, in said expandable means, synthetic fibers in minor proportion.

5. The combination of claim 1 wherein said elements are defined by a pair of spaced hull wall means of a floating body, said expandable means on exposure to, and absorption of, the liquid in which the body is floating due to a puncture of at least one of said wall means, expanding to fill the space between said wall means whereby the puncture is sealed.

6. In combination, a pair of elements defining a space therebetween, expandable means at least partially filling said space, said expandable means expanding to completely fill said space upon exposure to, and absorption of, a liquid, said elements being defined by the periphery of a door and portions of a door frame surrounding the periphery of the door, the door forming a barrier between adjacent chambers in a floating body, said expandable means being carried by one of said elements and normally slightly spaced from the other of said elements to permit unhindered closing of the door, and said expandable means, on exposure to, and absorption of, the liquid in which the body is floating, present in one of the chambers due to a leak in the floating body, expanding to fill the space between said elements thereby sealing the same and precluding passage of the liquid to the other chamber.

7. In combination with wall means defining an enclosed area, said wall means including two major walls, a plurality of bodies adapted to expand upon exposure to and absorption of liquid whereby to fill said area and seal a puncture in at least one of said walls, said bodies being compressed and comprising at least predominantly dry wood pulp, said bodies further comprising a fixative which sets upon reaction with water to stabilize said bodies in expanded condition.

8. In combination with fixed wall means defining an enclosed area, said wall means including two major walls, a plurality of dry bodies comprising predominantly fibrous material, said bodies being expandable upon exposure to and absorption of liquid whereby to fill said area and seal a puncture in at least one of said walls, said bodies being substantially only monoaxially expandable with absorption of liquid thereby, said bodies being disposed to expand monoaxially parallel to said two major walls, whereby said material migrates laterally with expansion toward a puncture in at least one of said walls.

9. The combination defined in claim 8 wherein said bodies are arranged in at least two groups, one of said two groups having bodies therein monoaxially expandable in one direction, and the other of said two groups having bodies therein monoaxially expandable in a direction perpendicular to said one direction.

10. The combination defined in claim 8 wherein said bodies are monoaxially compressed with the fibrous material therein assuming a general orientation perpendicular to the axis of compression, and wherein said axis of compression of said bodies extends at least generally parallel to said two walls.

11. In a ship of the type having inner and outer spaced apart fixed hull walls defining an area therebetween the improvement which comprises:
    (a) said area being filled with a plurality of fibrous bodies;
    (b) said bodies comprising dry compressed fibrous material; and
    (c) said bodies being at least predominantly monoaxially expandable substantially parallel to said walls with absorption of liquid thereby.

12. In a ship of the type having inner and outer spaced apart fixed hull walls defining an area therebetween the improvement which comprises:
    (a) said area being filled with compressed dry wood pulp bodies;
    (b) said bodies being monoaxially expandable with absorption of liquid thereby; and
    (c) said bodies being disposed so as to migrate, upon expansion, laterally toward a puncture in said walls through which a liquid enters said area.

13. The improvement defined in claim 12 wherein said bodies include a dry fixative reactive with said liquid to stabilize said bodies as expanded.

14. In combination, a pair of elements defining a space therebetween which is to be sealed in the presence of a liquid, expandable means carried by at least one of said elements and adapted to expand into sealing contact with the other of said elements upon exposure to, and absorption of, the liquid, said expandable means being substantially dry and comprising compressed, predominantly fibrous material, said fibrous material being dry wood pulp compressed in a single direction to render the same monoaxially expandable, said elements including juxtaposed surfaces defining said space, and expandable means being disposed between said elements with said direction extending at least substantially perpendicularly to said surfaces.

15. In combination a liquid impermeable door having a periphery defining a first surface, a door frame surrounding said periphery and defining a second surface extending in slightly spaced relationship with respect to said first surface when said door is closed, said door defining a barrier between two adjacent chambers, and a sealing means carried by at least one of said surfaces, said sealing means being substantially dry and including compressed, predominantly fibrous material expandable into sealing engagement with the other of said surfaces upon exposure to, and absorption of, a liquid whereby liquid entering one chamber will be precluded from passing into the other chamber.

16. The combination of claim 15 wherein said sealing means extends completely about said periphery.

17. The combination of claim 16 wherein said periphery is recessed to define said first surface, said sealing means being carried within the recess.

18. The combination of claim 17 wherein said sealing means is defined by a plurality of juxtaposed expandable bodies carried within said recess.

19. The combination of claim 16 further including a covering means extending over said recess and retaining said sealing means therein.

20. The combination of claim 19 wherein said covering means is liquid permeable.

21. The combination of claim 19 wherein said covering means is frangible under the pressure of expansion of said sealing means.

22. The combination of claim 17 wherein portions of said door define a plurality of spaced apertures communicating with said recess to facilitate exposing said sealing means to the liquid.

23. The combination of claim 14 wherein said liquid is water and said fibrous material is hydrophilic.

24. The combination of claim 15 wherein said liquid is water and said fibrous material is hydrophilic.

References Cited by the Examiner
UNITED STATES PATENTS

| | | | |
|---|---|---|---|
| 425,363 | 4/1890 | De LaBarriere | 114—69 |
| 534,611 | 2/1895 | Marsden | 114—69 |
| 2,094,691 | 10/1937 | Williams | 277—1 |
| 2,260,652 | 10/1941 | Ashley | 217—97 X |
| 2,844,118 | 7/1958 | Kummerman | 114—117 X |

FERGUS S. MIDDLETON, *Primary Examiner.*

MILTON BUCHLER, *Examiner.*

T. M. BLIX, *Assistant Examiner.*